United States Patent
Kara et al.

(10) Patent No.: US 10,460,237 B2
(45) Date of Patent: Oct. 29, 2019

(54) NEURON-CENTRIC LOCAL LEARNING RATE FOR ARTIFICIAL NEURAL NETWORKS TO INCREASE PERFORMANCE, LEARNING RATE MARGIN, AND REDUCE POWER CONSUMPTION

(71) Applicant: INTERNATIONAL BUSINESS MACHINES CORPORATION, Armonk, NY (US)

(72) Inventors: Irem Boybat Kara, Ruschlikon (CH); Geoffrey Burr, Cupertino, CA (US); Carmelo di Nolfo, San Jose, CA (US); Robert Shelby, Boulder Creek, CA (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 14/954,468

(22) Filed: Nov. 30, 2015

(65) Prior Publication Data
US 2017/0154259 A1 Jun. 1, 2017

(51) Int. Cl.
*G06N 3/08* (2006.01)
*G06N 3/063* (2006.01)

(52) U.S. Cl.
CPC ........... *G06N 3/084* (2013.01); *G06N 3/0635* (2013.01)

(58) Field of Classification Search
None
See application file for complete search history.

(56) References Cited

U.S. PATENT DOCUMENTS 5,003,490 A   3/1991 Castelaz
5,832,466 A   11/1998 Feldgajer
(Continued)

OTHER PUBLICATIONS

Screen captures from YouTube video clip by Hinton et al. enititled "Neural Networks for Machine Learning Lecture 6d", 4 pages, uploaded by user "Artificial Intelligence Courses" on Nov. 5, 2013. Retrieved from Internet: <https://www.youtube.com/watch?v=u8dHl8De-cc> (Year: 2013).*
(Continued)

*Primary Examiner* — Alan Chen
(74) *Attorney, Agent, or Firm* — IP Authority, LLC; Ramraj Soundararajan

(57) ABSTRACT

Artificial neural networks (ANNs) are a distributed computing model in which computation is accomplished using many simple processing units (called neurons) and the data embodied by the connections between neurons (called synapses) and the strength of these connections (called synaptic weights). An attractive implementation of ANNs uses the conductance of non-volatile memory (NVM) elements to code the synaptic weight. In this application, the non-idealities in the response of the NVM (such as nonlinearity, saturation, stochasticity and asymmetry in response to programming pulses) lead to reduced network performance compared to an ideal network implementation. Disclosed is a method that improves performance by implementing a learning rate parameter that is local to each synaptic connection, a method for tuning this local learning rate, and an implementation that does not compromise the ability to train many synaptic weights in parallel during learning.

17 Claims, 5 Drawing Sheets

(56) References Cited

U.S. PATENT DOCUMENTS

| | | | |
|---|---|---|---|
| 6,564,153 B2 | 5/2003 | Braun et al. | |
| 6,601,049 B1 | 7/2003 | Cooper | |
| 6,965,885 B2 | 11/2005 | Gutta et al. | |
| 7,904,398 B1 | 3/2011 | Repici | |
| 2008/0319933 A1* | 12/2008 | Moussa | G06N 3/02 706/31 |
| 2015/0106311 A1 | 4/2015 | Birdwell et al. | |

OTHER PUBLICATIONS

Hasan et al., Enabling Back Propagation Training of Memristor Crossbar Neuromorphic Processors, IJCNN (Jul. 2014) at pp. 21-28 (Year: 2014).*

Rob Law, Back-propagation Learning in Improving the Accuracy of Neural Network-based Tourism Demand Forecasting, Tourism Management 21 (2000) pp. 331-340 (Year: 2000).*

Priddy et al., Artificial Neural Networks: An Introduction (2005) (Year: 2005).*

Hinton, C321: 2011 Introduction to Neural Networks and Machine Learning, Lec. 9 at pp. 1-17, University of Toronto, Retrieved from Internet <https://web.archive.org/web/20110708182103/https://www.cs.toronto.edu/~hinton/csc321/notes/lec9.pdf> dated Jul. 8, 2011 (Year: 2011).*

Automatically generated transcript to Screen captures from YouTube video clip by Hinton et al., entitled "Neural Networks for Machine Learning Lecture 6d" (Year: 2013).*

Jackson et al., "Nanoscale Electronic Synapses Using Phase Change Devices," ACM Journal on Emerging Technologies in Computing Systems, 9(2), Art. 12, May 2013, 20pgs.

Burr et al., "Experimental Demonstration and Tolerancing of a Large-Scale Neural Network (165,000 synapses), Using Phase-Change Memory as the Synaptic Weight Element," Electron Devices Meeting (IEDM), 2014 IEEE International Conference, Dec. 15-17, 2014, San Francisco, CA, US, 3pgs.

Jacobs, "Increased Rates of Convergence Through Learning Rate Adaptation," Neural Networks, vol. 1, 1988, pp. 295-307.

Suri et al., Phase Change Memory as Synapse for Ultra-Dense Neuromorphic Systems: Application to Complex Visual Pattern Extraction, Electron Devices Meeting (IEDM), 2011 IEEE International Conference, Dec. 5-7, 2011, Washington, DC, USA, 4pgs.

Rumelhart et al., "Learning Internal Representations by Error Propagation," Parallel Distributed Processing: Explorations in the Microstructure of Cognition, vol. 1, 1986, MIT Press, Cambridge, MA, US, pp. 318-362.

Schraudolph, Local Gain Adaptation in Stochastic Gradient Descent, Technical Report IDSIA-09-99, Mar. 8, 1999 (revised May 15, 1999), 7pgs.

* cited by examiner

NEURON-CENTRIC LOCAL LEARNING RATE FOR ARTIFICIAL NEURAL NETWORKS TO INCREASE PERFORMANCE, LEARNING RATE MARGIN, AND REDUCE POWER CONSUMPTION

BACKGROUND OF THE INVENTION

Field of Invention

The present invention relates generally to the field of artificial neural networks (ANNs). More specifically, the present invention is related to neuron-centric local learning rate for artificial neural networks to increase performance and learning rate margin, and reduce power consumption.

Discussion of Related Art

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it, and thus by the outputs of these "upstream" connected neurons and the strength of the connections as determined by the synaptic weights. The ANN is trained to solve a specific problem (e.g., pattern recognition) by adjusting the weights of the synapses such that a particular class of inputs produces a desired output. The weight adjustment procedure is known as "learning." There are many algorithms in the ANN literature for performing learning that are suitable for various tasks such as image recognition, speech recognition, language processing, etc. Ideally, these algorithms lead to a pattern of synaptic weights that, during the learning process, converges toward an optimal solution of the given problem.

An attractive implementation of ANNs uses some (e.g., CMOS) circuitry to represent the neuron, the function of which is to integrate or sum the aggregate input from upstream neurons to which a particular neuron is connected, and apply some nonlinear function of the input to derive the output of that neuron. Because in general, each neuron is connected to some large fraction of the other neurons, the number of synapses (connections) is much larger than the number of neurons; thus it is advantageous to use some implementation of synapses that can achieve very high density on a neuromorphic computing chip. One attractive choice is a non-volatile memory (NVM) technology such as resistive random access memory (RRAM) or phase-change memory (PCM). Since both positive and negative (i.e., excitatory and inhibitory) weights are desired, one scheme uses a pair of NVM to represent the weight as the difference in conductance between the two (see M. Suri et al., *IEDM Tech. Digest*, 4.4 (2011)). This scheme is shown in FIG. 1. The outputs of the upstream $N_i$ neurons are summed in parallel through pairs of NVM conductances into the positive and negative inputs of the downstream $M_i$ neurons. This parallelism is highly advantageous for efficient computation.

During learning, the conductances of the NVM elements are programmed by sending them pulses that can either increase or decrease the conductance according to a learning rule. One common learning rule is backpropagation (see D. Rumelhart et al., *Parallel Distributed Processing*, MIT Press (1986)), which is used extensively in deep learning networks that are currently being implemented on graphical processing units (GPU's) for image recognition, learning to play video games, etc. The backpropagation algorithm calls for a weight update $\Delta w_{ij} = \eta \cdot x_i \cdot \delta_j$ that is proportional to the product of the output of the upstream neuron, $x_i$, and the error contribution from the downstream neuron, $\delta_j$, with the proportionality constant, $\eta$, known as the learning rate. When an array of NVM is used to represent the weights as in FIG. 1, the advantage of parallel programming of weight updates during learning can be maintained if the pulses sent to the NVM by the $N_i$ are determined solely by $x_i$, and the pulses sent by the $M_j$ are determined solely by $\delta_j$. There have been several schemes proposed for this. We have implemented one in which the magnitude of $x_i$ and $\delta_j$ are encoded by the number and timing of programming pulses sent by the upstream and downstream neurons in such a way that the number of pulses from both directions that overlap in time approximates the product $\eta \cdot x_i \cdot \delta_j$. The selector devices in series with the NVM elements ensure that only pairs of pulses that overlap in time are effective in programming the NVM conductance.

To show that this "crossbar-compatible" learning rule is as effective as the conventional backpropagation rule, we have performed simulations of a three-layer perceptron network applied to the recognition of the handwritten digit images in the MNIST database. These simulations show that this learning rule gives equivalent network performance (see FIG. 2), when the conductance response of the NVM is linear and unbounded, i.e., when every pulse produces a constant change in conductance, and the maximum conductance does not saturate. FIG. 2 compares the simulated performance of the ANN using the usual direct weight updates (dashed curves) with the pulsed, crossbar-compatible weight update method, which allows parallel weight update, and shows that equivalent performance is achieved. The same results are shown on a linear vertical scale, and in the inset, with a stretched vertical scale that better displays the part of the results that are close to 100%. The curves show performance during training, the star shows generalization performance.

Any real NVM element has a non-ideal response. It is nonlinear and has a limit to the maximum conductance it can achieve. The conductance change to a pulse designed to increase conductance is different than that of a pulse designed to decrease conductance, i.e., the response is asymmetric. There are variations among devices, some devices will be inoperable, either stuck in a high conductance state or stuck in a low conductance state. Our work has shown that many of these defects cause very little decrease in ANN performance. However, nonlinearity, bounded conductance and asymmetric response cause a reduction in accuracy for the MNIST digit recognition problem from 99+% accuracy during training to something between 80% and 85%. Worse, the range of learning rate that can achieve this performance is much narrower than for a more ideal response; thus parameters such as the learning rate and the slope of neuron response function must be carefully tuned to achieve even this reduced performance. The proposed mechanism for this is as follows: During training, many different inputs are presented to the network and the backpropagation learning rule is used to update the NVM conductances after each (or after some small number of inputs, called a minibatch). Some weights in the network tend to evolve steadily toward some stable value, while others tend to dither up and down, sometimes increasing, other times decreasing. When the NVM response is nonlinear or asymmetric, the response to a pulse intended to decrease the weight absolute value will be stronger usually than one intended to increase the weights. This tends to push many of these weights near to zero, and this makes the backpropagation learning rule ineffective. This phenomenon, which is a problem the prior art fails to remedy, is referred to as a network freeze-out.

Embodiments of the present invention are an improvement over prior art systems and methods.

SUMMARY OF THE INVENTION

In one embodiment, the present invention provides a neuron-centric method implemented in an artificial neural network (ANN) to mitigate network freeze out, the ANN comprising a plurality of neurons arranged in layers with the outputs of one layer connected to the inputs of each neuron of the subsequent layer, where neurons are connected to each other via a synapse, each synapse having a synaptic weight encoding a connection strength between two connected neurons, where a plurality of training examples are serially input to the matrix while observing its output, where a backpropagation algorithm updates the synaptic weight in response to a difference between the output from a given layer and a desired output from said given layer, the neuron-centric method comprising: (a) storing a local learning rate value in each neuron where an effective learning rate applied to each synapse is determined jointly by local learning rates of two connected neurons; (b) identifying two connected neurons whose synaptic weight dithers during the network freeze out; (c) suppressing activity of the two connected neurons of (b) whose synaptic weight dithers, by decreasing the effective learning rate of it; and (d) increasing local learning rates of at least one other connected neurons; wherein the suppressing step (c) and the increasing step (d) stabilizes network performance and mitigates the network freeze out.

In another embodiment, the present invention provides an article of manufacture having a computer usable medium having computer readable program code embodied therein which implements a neuron-centric method implemented in an artificial neural network (ANN) to mitigate network freeze out, the ANN comprising a plurality of neurons arranged in layers with the outputs of one layer connected to the inputs of each neuron of the subsequent layer, where neurons are connected to each other via a synapse, each synapse having a synaptic weight encoding a connection strength between two connected neurons, where a plurality of training examples are serially input to the matrix while observing its output, where a backpropagation algorithm updates the synaptic weight in response to a difference between the output from a given layer and a desired output from said given layer, said medium comprising: (a) computer readable program code storing a local learning rate value in each neuron where an effective learning rate applied to each synapse is determined jointly by local learning rates of two connected neurons; (b) computer readable program code identifying two connected neurons whose synaptic weight dithers during the network freeze out; (c) computer readable program code suppressing activity of the two connected neurons of (b) whose synaptic weight dithers, by decreasing the effective learning rate of it; and (d) computer readable program code increasing local learning rates of at least one other connected neurons; wherein the suppressing step (c) and the increasing step (d) stabilizes network performance and mitigates the network freeze out.

In yet another embodiment, the present invention provides a method of enhancing the performance of an artificial neural network using local learning rates, the network comprising: a plurality of simple processing units called neurons where neurons are connected to each other via a synapse, each synapse having a synaptic weight encoding a connection strength between two connected neurons, the plurality of neurons arranged in layers with the outputs of one layer connected to the inputs of each neuron of the subsequent layer; where a plurality of training examples are serially input to the network while observing its output; and where a back-propagation algorithm is used to update the synaptic weights in response to a difference between the output from a given layer and a desired output from said given layer; wherein the method comprises: modifying a magnitude of a synaptic weight of the update by one or two local learning rates stored in at least one of two connected neurons that are connected by an individual synapse; determining local learning rates using rules implemented by the two connected neurons where the local learning rates are stored; and iterating the training examples until the output approaches the desired output within a desired accuracy.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
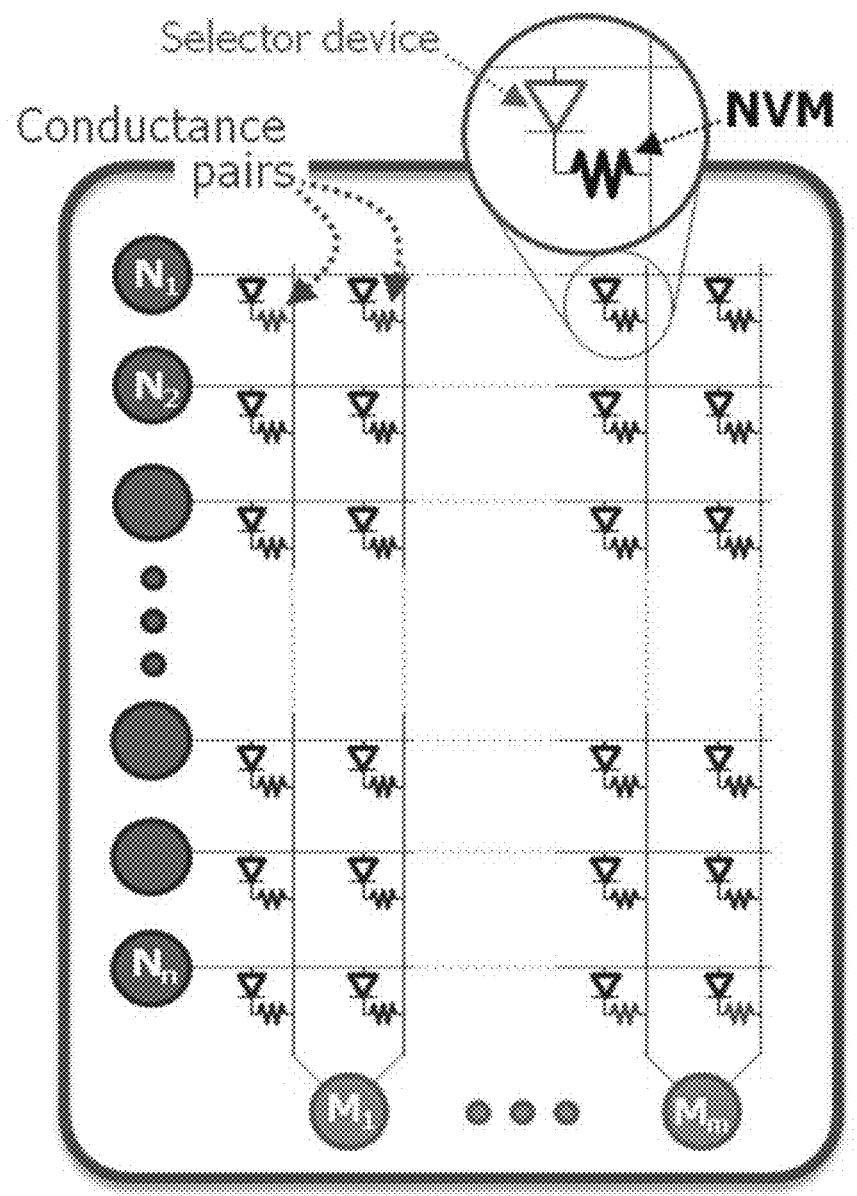
FIG. 1 illustrates an example artificial neural network (ANN).
Figure 2:
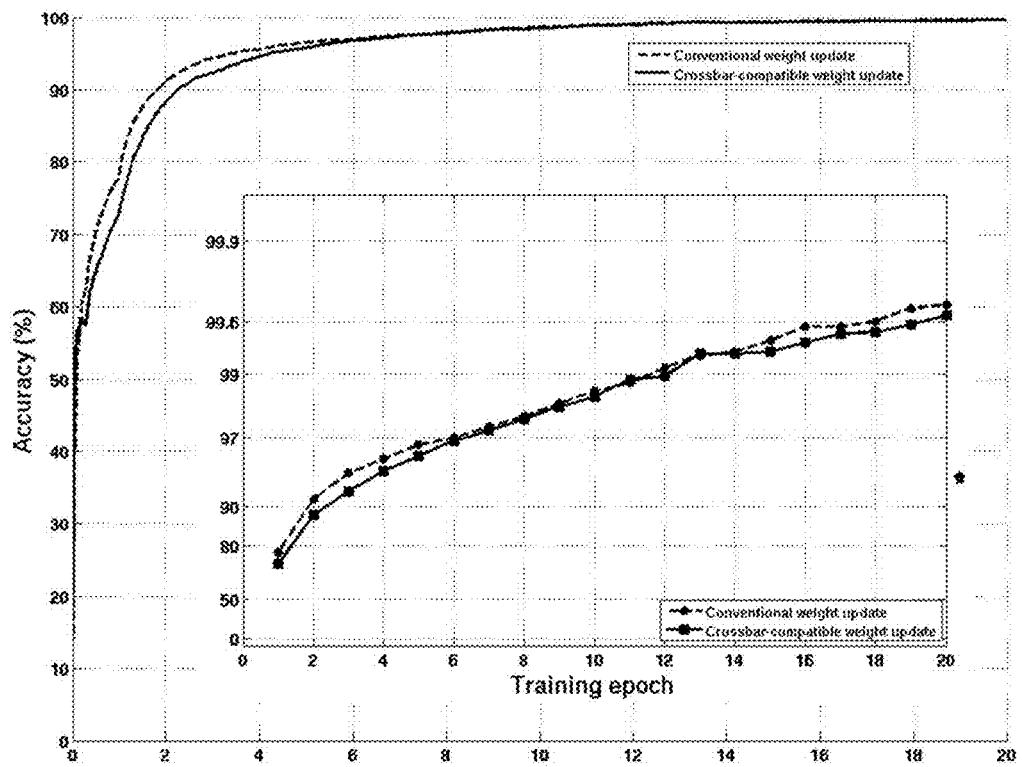
FIG. 2 illustrates simulations of a three-layer perceptron network applied to the recognition of the handwritten digit images in the MNIST database.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The invention described herein is able to mitigate network freeze-out. It does so by suppressing the activity of the weights that dither up and down, allowing them to stabilize at some non-zero value of the weight. The other synapses in the network respond to produce a better overall network performance than if the dithering weights were allowed full response.

The means of suppressing the activity of the dithering weights is to implement a local learning rate for each synapse and a rule for determining the local learning rate that decreases it for the dithering synapses and increases it for the ones that are being consistently usefully programmed. The simplest rule decreases local learning rate for synapses for which the value of the weight update, $\Delta w_{ij}$ changes sign from one training example to the next, and increases the local learning rate for synapses for which the sign of the weight update is consistently positive or negative. This basic idea was introduced by Robert A. Jacobs, in the paper titled, "Increased Rates of Convergence Through Learning Rate Adaptation," *Neural Networks*, 1, (1988). There have been several publications since that have further refined this idea, with resultant improvements in network performance.

However, all of these implementations require a local learning rate value to be stored somewhere for each synapse, and that this number must be queried before applying the weight update to a synapse. This destroys the parallelism of the crossbar-compatible learning rule.

The present invention solves this problem by assigning a local learning rate to each neuron rather than to each synapse. Each neuron then determines the number of programming pulses to send based on its own local learning rate, as well as its output value $x_i$ for the upstream neurons and the backpropagated error $\delta_j$ for the downstream neurons. Thus, the effective local learning rate applied to each synapse is determined jointly by the two neurons that it connects. By constraining the neuron output values, $x_i$ to always be positive, the changes in sign of the error, $\delta_j$ effectively capture the changes in sign of the weight updates and therefore the dithering problem outlined above. Each downstream neuron decides how many pulses to send to upstream NVM elements based on the product $\eta \cdot g_j^\delta \cdot \delta_j$ where $\eta$ is the global learning rate for the entire network, and $g_j^\delta$ is the local learning rate for neuron j, which is adjusted based on the behavior of the backpropagated error, $\delta_j$. The rule for adjusting the local learning rates is to reduce local learning rate when the sign of $\delta_j$ changes from one training example to the next, and to increase it when the sign is the same. In our specific implementation, the local learning rate is constrained to be between 0.1 and 10.0. When sgn($\delta_j(t)$)=sgn($\delta_j(t-1)$), i.e., the sign of the error is the same from one step to another, we increase the local learning rate according to $g_j^\delta(t)=g_j^\delta(t-1)+\in$ where $\in=0.05$ is a typical value of the increment used. When the sign of the error differs from that in the previous step we decrease the local learning rate by a fraction, according to $g_j^\delta(t)=g_j^\delta(t-1)\cdot\lambda$ where $\lambda=0.95$ is a typical fraction used.

A local learning rate $g_i^x$ can also be implemented for the upstream neuron output pulses that are controlled by the variation in output of each neuron. This does not make sense for the hidden layers of a perceptron network, since the outputs are always positive, but can be useful for the input layer. One method is to update the local learning rate for the input layer based on variations of the input values. We found this somewhat beneficial, but was based on some empirical rule derived from the variability of the input, which was not guaranteed to reflect the importance of each input in determining the variation of the weight updates. The method that has been the best to date is to compute a backpropagated error for the input neurons and use the variation of the sign of this error as described above to determine the changes in the local learning rate $g_i^x$ for the input layer of neurons.

Figure 3A:
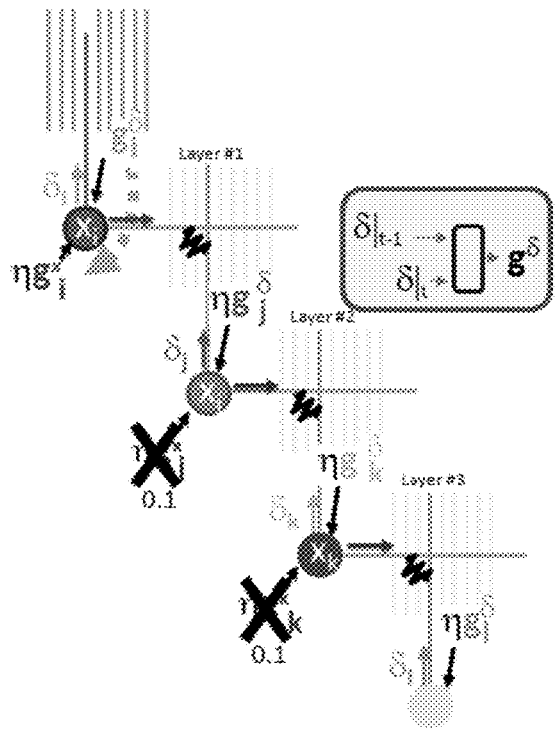
FIG. 3A illustrates the present invention's local learning rate scheme.

FIG. 3A summarizes this scheme and shows the increased margin in global learning rate that results from the relative reduction of dithering in the most active synapses. Downstream local learning rates $g_j^\delta$ are updated based on the variation of the sign of the error, $\delta_j$ from time step t−1 to step t. Upstream neuron local learning rates, $g_i^x$ are used only for the input layer, and are calculated based on the $\delta_i$ value calculated as though there were another layer before the input. On the right, the improved accuracy and learning rate margin is shown in comparison to the performance without local learning rate.

Figure 3B:
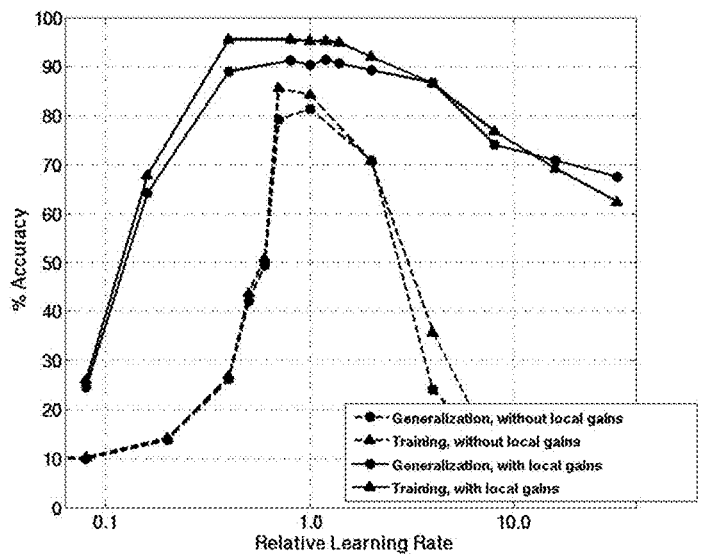
FIG. 3B illustrates the improved accuracy of the present invention's local learning rate scheme.
Figure 4:
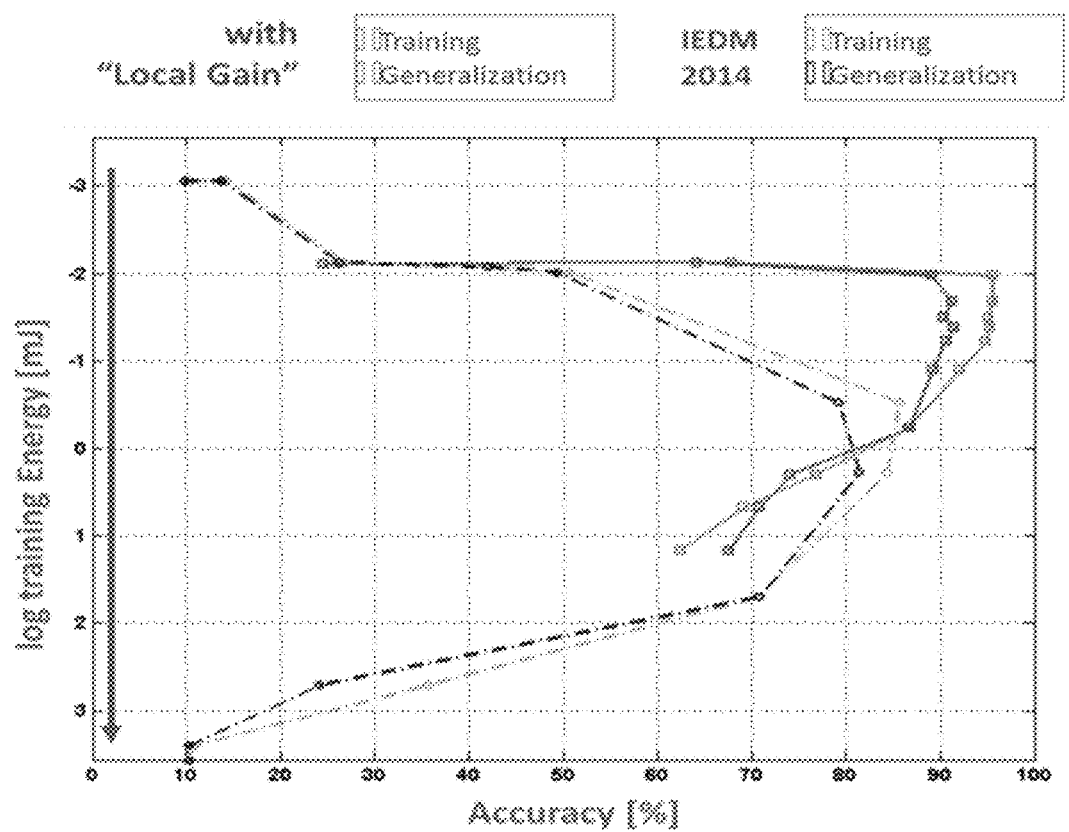
FIG. 4 illustrates the reduction in programming energy that results from the present invention's local learning rate method.

FIG. 4 shows the reduction in programming energy which results from this local learning rate method. The programming energy used to achieve a given accuracy is shown for the data presented in FIG. 3B. FIG. 3B shows simulated performance of a network using pairs phase-change memory (PCM) devices to represent synaptic weights. The horizontal axis is the global relative learning rate, and the vertical axis is the accuracy for identifying handwritten digits using this network. Triangles show during the training of the network. Dots show the accuracy on a set of test digits it has not been trained on, also known as generalization accuracy. Dashed lines show performance using our crossbar-compatible weight update scheme, but no local learning rates. Solid lines show that implementing this invention, using local learning rate as described herein gives higher accuracy and greater tolerance to variation in the global learning rate. Because the programming of NVM elements that are constantly changing sign is reduced by the local learning rate method, the best accuracy is obtained with less total programming energy. This assumes 3 pJ for each SET pulse and 30 pJ for each RESET pulse (B. Jackson, et al., "Nanoscale Electronic Synapses Using Phase Change Devices," *ACM Journal on Emerging Technologies in Computing Systems*, 9, Article 12 (2013)).

Figure 5:
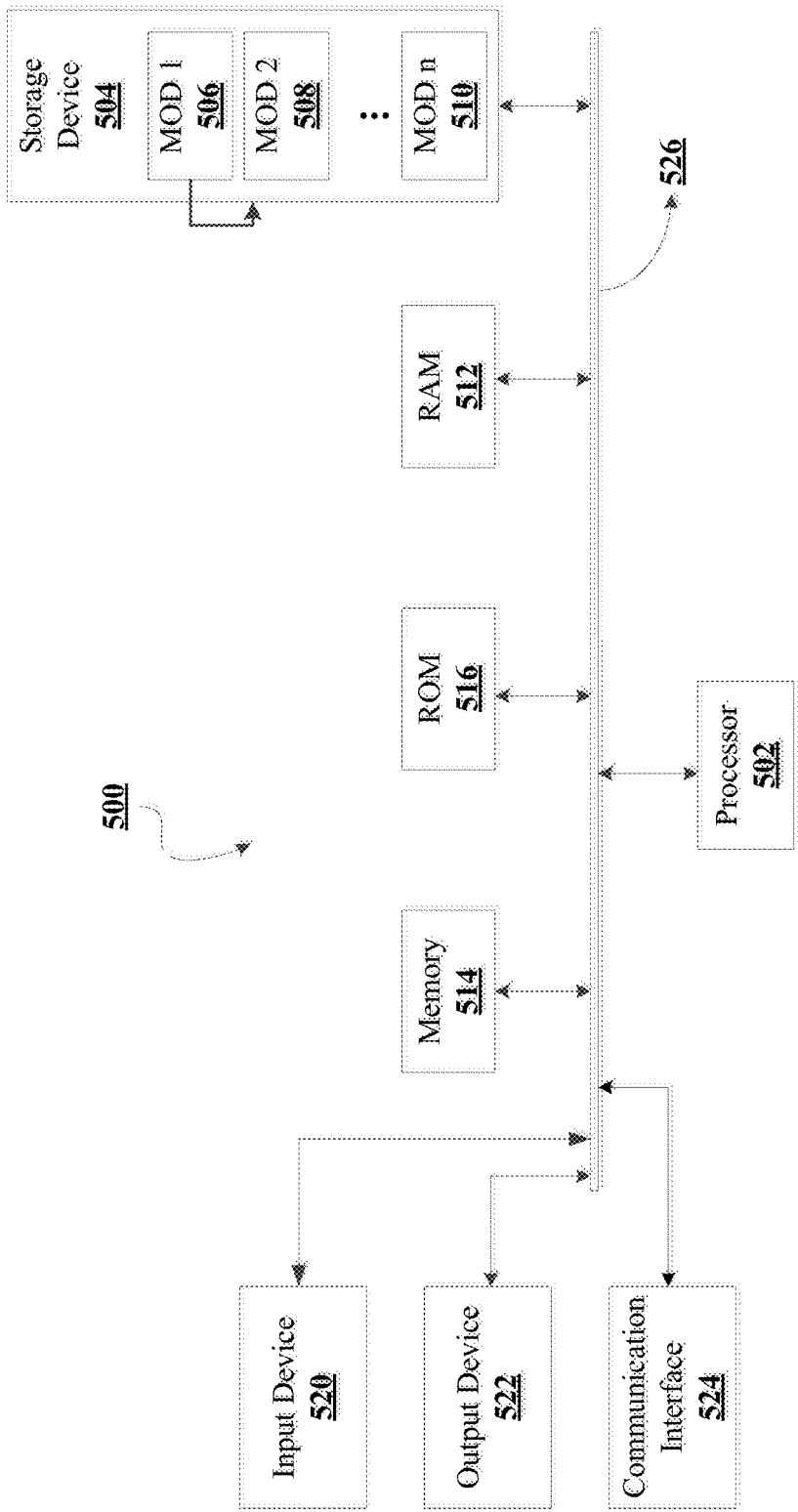
FIG. 5 illustrates an exemplary system to implement the present invention's methods of mitigating network freeze-outs.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited non-transitory computer-readable storage media. With reference to FIG. 5, an exemplary system includes a general-purpose computing device 500, including a processing unit (e.g., CPU) 502 and a system bus 526 that couples various system components including the system memory such as read only memory (ROM) 516 and random access memory (RAM) 512 to the processing unit 502. Other system memory 514 may be available for use as well. It can be appreciated that the invention may operate on a computing device with more than one processing unit 502 or on a group or cluster of computing devices networked together to provide greater processing capability. A processing unit 502 can include a general purpose CPU controlled by software as well as a special-purpose processor.

The computing device 500 further includes storage devices such as a storage device 504 (such as, but not limited to, a magnetic disk drive, an optical disk drive, tape drive or the like). The storage device 504 may be connected to the system bus 526 by a drive interface. The drives and the associated computer readable media provide nonvolatile storage of computer readable instructions, data structures, program modules and other data for the computing device 500. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 500, an input device 520 represents any number of input mechanisms, such as a microphone for speech, a touch-sensitive screen for gesture or graphical input, keyboard, mouse, motion input, speech and so forth. The output device 522 can also be one or more of a number of output mechanisms known to those of skill in the art. In some instances, multimodal systems enable a user to provide multiple types of input to communicate with the computing device 500. The communications interface 524 generally governs and manages the user input and system output. There is no restriction on the invention operating on any particular hardware arrangement and therefore the basic features here may easily be substituted for improved hardware or firmware arrangements as they are developed.

Logical operations can be implemented as modules configured to control the processor 502 to perform particular functions according to the programming of the module. FIG. 5 also illustrates three modules MOD 1 506, MOD 2 508 and MOD n 510, which are modules controlling the processor 502 to perform particular steps or a series of steps. These modules may be stored on the storage device 504 and loaded into RAM 512 or memory 514 at runtime or may be stored as would be known in the art in other computer-readable memory locations.

Modules MOD 1 506, MOD 2 508 and MOD n 510 may, for example, be modules controlling the processor 502 to perform the following steps: (a) storing a local learning rate value in each neuron where an effective learning rate applied to each synapse is determined jointly by local learning rates of two connected neurons; (b) identifying two connected neurons whose synaptic weight dithers during the network freeze out; (c) suppressing activity of the two connected neurons of (b) whose synaptic weight dithers, by decreasing the effective learning rate of it; and (d) increasing local learning rates of at least one other connected neurons; wherein the suppressing step (c) and the increasing step (d) stabilizes network performance and mitigates the network freeze out.

Modules MOD 1 506, MOD 2 508 and MOD n 510 may, for example, be modules controlling the processor 502 to perform the following steps: (a) modifying a magnitude of a synaptic weight of the update by one or two local learning rates stored in at least one of two connected neurons that are connected by an individual synapse; (b) determining local learning rates using rules implemented by the two connected neurons where the local learning rates are stored; and (c) iterating the training examples until the output approaches the desired output within a desired accuracy.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

CONCLUSION

A system and method has been shown in the above embodiments for the effective implementation of a neuron-centric local learning rate for artificial neural networks to increase performance and learning rate margin, and reduce power consumption. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. An artificial neural network (ANN) comprising:
a plurality of neurons arranged in layers with the outputs of one layer connected to the inputs of each neuron of the subsequent layer, where neurons are connected to each other via a synapse, each synapse having a synaptic weight encoding a connection strength between two connected neurons, the synaptic weight implemented using a non-volatile memory (NVM), where a plurality of training examples are serially input to the matrix while observing its output, where a backpropagation algorithm updates the synaptic weight in response to a difference between the output from a given layer and a desired output from said given layer,
a storage having computer readable program code embodied therein which implements a neuron-centric method to mitigate network freeze out, the computer readable program code:
(a) storing a local learning rate value in each neuron, where an effective learning rate applied to each synapse is determined jointly by local learning rates of two connected neurons;
(b) identifying two connected neurons whose synaptic weight dithers during the network freeze out;
(c) suppressing activity of the two connected neurons of (b) whose synaptic weight dithers, by decreasing the effective learning rate of it; and
(d) increasing local learning rates of at least one other connected neurons;
wherein the suppressing step (c) and the increasing step (d) stabilize network performance and mitigate the network freeze out.

2. The artificial neural network (ANN) of claim 1, wherein a pair of NVM conductances represent the synaptic weights, with one NVM conductance in the pair providing a positive current contribution and the other NVM conductance in the pair providing a negative current contribution.

3. The artificial neural network (ANN) of claim 1, wherein the NVM is selected from the group consisting of resistive random access memory (RRAM) and phase-change memory (PCM).

4. The artificial neural network (ANN) of claim 1, wherein the ANN is used as part of an application that is selected from the group consisting of: pattern recognition application, image recognition application, speech recognition application, and language processing application.

5. The artificial neural network (ANN) of claim 1, wherein the plurality of neurons comprises a plurality of upstream neurons and a plurality of downstream neurons, where each neuron in the ANN determines (i) a number of programming pulses to send downstream based on its own local learning rate, (ii) its output value $x_i$ for the upstream neurons, and (iii) a backpropagated error $\delta_j$ for the downstream neurons.

6. The artificial neural network (ANN) of claim 5, wherein the suppressing step (c) and the increasing step (d) constrain the output value $x_i$ to always be positive, and where changes in sign of the backpropagated error $\delta_j$ capture changes in sign of weight updates with regards to the dithering, and where a rule adjusts local learning rates by reducing local learning rate when the sign of $\delta_j$ changes from one training example to the next, and the rule adjusts local learning rates by increasing it when the sign is the same.

7. The artificial neural network (ANN) of claim 6, wherein each downstream neuron decides how many pulses to send to upstream neurons based on the product $\eta \cdot g_j^\delta \cdot \delta_j$ where $\eta$ is a global learning rate for the ANN, and $g_j^\delta$ is a local learning rate for neuron j, which is adjusted based on the behavior of the backpropagated error, $\eta_j$.

8. The artificial neural network (ANN) of claim 6, wherein the local learning rate is constrained to be between 0.1 and 10.0, and when $\text{sgn}(\delta_j(t))=\text{sgn}(\delta_j(t-1))$ the local learning rate is increased according to $g_j^\delta(t)=g_j^\delta(t-1)+\in$ where $\in$ is a predetermined incremental value, and when the sign of the error differs from that in the previous step, the local learning rate is decreased by according to $g_j^\delta(t)=g_j^\delta(t-1)\cdot\lambda$ where $\lambda$ is a predetermined fraction, with $\lambda$ is greater than $\epsilon$.

9. An artificial neural network (ANN) comprising:
a plurality of neurons arranged in layers with the outputs of one layer connected to the inputs of each neuron of the subsequent layer, where neurons are connected to each other via a synapse, each synapse having a synaptic weight encoding a connection strength between two connected neurons, the synaptic weight implemented using a non-volatile memory (NVM), where a plurality of training examples are serially input to the matrix while observing its output, where a backpropagation algorithm updates the synaptic weight in response to a difference between the output from a given layer and a desired output from said given layer, wherein the plurality of neurons comprises a plurality of upstream neurons and a plurality of downstream neurons, where each neuron in the ANN determines (i) a number of programming pulses to send downstream based on its own local learning rate, (ii) its output value xi for the upstream neurons, and (iii) a backpropagated error $\delta_j$ for the downstream neurons;
a storage having computer readable program code embodied therein which implements a neuron-centric method to mitigate network freeze out, the computer readable program code:
(a) storing a local learning rate value in each neuron, where an effective learning rate applied to each synapse is determined jointly by local learning rates of two connected neurons;
(b) identifying two connected neurons whose synaptic weight dithers during the network freeze out;
(c) suppressing activity of the two connected neurons of (b) whose synaptic weight dithers, by decreasing the effective learning rate of it; and
(d) increasing local learning rates of at least one other connected neurons;
wherein the suppressing in (c) and the increasing in (d) stabilize network performance and mitigate the network freeze out by constraining the output value $x_i$ to always be positive, and where changes in sign of the backpropagated error $\delta_j$ capture changes in sign of weight updates with regards to the dithering, and where a rule adjusts local learning rates by reducing local learning rate when the sign of $\delta_j$ changes from one training example to the next, and the rule adjusts local learning rates by increasing it when the sign is the same.

10. The artificial neural network (ANN) of claim 9, wherein a pair of NVM conductances represent the synaptic weights, with one NVM conductance in the pair providing a positive current contribution and the other NVM conductance in the pair providing a negative current contribution.

11. The artificial neural network (ANN) of claim 9, wherein the NVM is selected from the group consisting of resistive random access memory (RRAM) and phase-change memory (PCM).

12. The artificial neural network (ANN) of claim 9, wherein the ANN is used as part of an application that is selected from the group consisting of: pattern recognition application, image recognition application, speech recognition application, and language processing application.

13. The artificial neural network (ANN) of claim 9, wherein the local learning rate is constrained to be between 0.1 and 10.0, and when $\text{sgn}(\delta_j(t))=\text{sgn}(\delta_j(t-1))$ the local learning rate is increased according to $g_j^\delta(t)=g_j^\delta(t-1)+\in$ where $\in$ is a predetermined incremental value, and when the sign of the error differs from that in the previous step, the local learning rate is decreased by according to $g_j^\delta(t)=g_j^\delta(t-1)\cdot\lambda$ where $\lambda$ is a predetermined fraction, with $\lambda$ is greater than $\in$.

14. An artificial neural network (ANN) comprising:
a plurality of neurons arranged in layers with the outputs of one layer connected to the inputs of each neuron of the subsequent layer, where neurons are connected to each other via a synapse, each synapse having a synaptic weight encoding a connection strength between two connected neurons, the synaptic weight implemented using a non-volatile memory (NVM), where a plurality of training examples are serially input to the matrix while observing its output, where a backpropagation algorithm updates the synaptic weight in response to a difference between the output from a given layer and a desired output from said given layer, wherein the plurality of neurons comprises a plurality of upstream neurons and a plurality of downstream neurons, where each neuron in the ANN determines (i) a number of programming pulses to send downstream based on its own local learning rate, (ii) its output value $x_i$ for the upstream neurons, and (iii) a backpropagated error $\delta_j$ for the downstream neurons;
a storage having computer readable program code embodied therein which implements a neuron-centric method to mitigate network freeze out, the computer readable program code:

(a) storing a local learning rate value in each neuron, where an effective learning rate applied to each synapse is determined jointly by local learning rates of two connected neurons;
(b) identifying two connected neurons whose synaptic weight dithers during the network freeze out;
(c) suppressing activity of the two connected neurons of (b) whose synaptic weight dithers, by decreasing the effective learning rate of it;
(d) increasing local learning rates of at least one other connected neurons, and wherein the suppressing in (c) and the increasing in (d) stabilize network performance and mitigate the network freeze out by constraining the output value $x_i$ to always be positive, and where changes in sign of the backpropagated error $\delta_j$ capture changes in sign of weight updates with regards to the dithering, and where a rule adjusts local learning rates by reducing local learning rate when the sign of $\delta_j$ changes from one training example to the next, and the rule adjusts local learning rates by increasing it when the sign is the same, and wherein the local learning rate is constrained to be between 0.1 and 10.0, and when $sgn(\delta_j(t))=sgn(\delta_i(t-1))$ the local learning rate is increased according to $g_j^\delta(t)=g_j^\delta(t-1)+\in$ where $\in$ is a predetermined incremental value, and when the sign of the error differs from that in the previous step, the local learning rate is decreased by according to $g_j^\delta(t)=g_j^\delta(t-1)\cdot\lambda$ where $\lambda$ is a predetermined fraction, with $\lambda$ is greater than $\in$.

15. The artificial neural network (ANN) of claim 14, wherein a pair of NVM conductances represent the synaptic weights, with one NVM conductance in the pair providing a positive current contribution and the other NVM conductance in the pair providing a negative current contribution.

16. The artificial neural network (ANN) of claim 14, wherein the NVM is selected from the group consisting of resistive random access memory (RRAM) and phase-change memory (PCM).

17. The artificial neural network (ANN) of claim 14, wherein the ANN is used as part of an application that is selected from the group consisting of: pattern recognition application, image recognition application, speech recognition application, and language processing application.

* * * * *